US011914331B2

(12) United States Patent
Romand et al.

(10) Patent No.: US 11,914,331 B2
(45) Date of Patent: Feb. 27, 2024

(54) METHOD FOR MANUFACTURING DECORATIVE PARTS

(71) Applicant: Comadur SA, Le Locle (CH)

(72) Inventors: Johan Romand, Le Gratteris (FR); Damien Le Boudouil, Morteau (FR); Nicolas Aubry, La Chenalotte (FR); Pierry Vuille, Les Emibois (CH); Alexandre Netuschill, Le Cerneux-Pequignot (CH)

(73) Assignee: Comadur SA, Le Locle (CH)

( * ) Notice: Subject to any disclaimer, the term of this patent is extended or adjusted under 35 U.S.C. 154(b) by 0 days.

(21) Appl. No.: 17/056,669

(22) PCT Filed: Jun. 18, 2019

(86) PCT No.: PCT/EP2019/066099
§ 371 (c)(1),
(2) Date: Nov. 18, 2020

(87) PCT Pub. No.: WO2020/002060
PCT Pub. Date: Jan. 2, 2020

(65) Prior Publication Data

US 2021/0208541 A1 Jul. 8, 2021

(30) Foreign Application Priority Data

Jun. 28, 2018 (EP) .................................... 18180562

(51) Int. Cl.
*G04B 45/00* (2006.01)
*G04B 19/18* (2006.01)
(Continued)

(52) U.S. Cl.
CPC ............ *G04B 45/0076* (2013.01); *B44C 1/26* (2013.01); *C25D 5/02* (2013.01); *C25D 5/34* (2013.01);
(Continued)

(58) Field of Classification Search
CPC ... G04B 45/0076; G04B 37/226; G04B 19/18
See application file for complete search history.

(56) References Cited

U.S. PATENT DOCUMENTS 3,433,013 A * 3/1969 Kohli .................. G04B 19/103
968/154
3,989,603 A * 11/1976 Montavon ................ B44C 1/22
968/153
(Continued)

FOREIGN PATENT DOCUMENTS

CH 699 993 A2 5/2010
CN 103253067 A 8/2013
(Continued)

OTHER PUBLICATIONS

International Search Report dated Aug. 5, 2019 in PCT/EP2019/066099 filed on Jun. 18, 2019, 3 pages.
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A method is for manufacturing a part including a support made of an electrically non-conductive material, the support being provided with at least one recess filled with an aesthetic element made of an electrically conductive material, and the aesthetic element forms a decoration on a side of the part that is intended to be visible. The method includes inlaying by pressing a preform intended to form the aesthetic element into the at least one recess of the support, and treating the surface of the aesthetic element. The at least one recess opens in one or more places onto a side of the part that is intended to be non-visible, to respectively form one or
(Continued)

more contact points for carrying current across the aesthetic element during the surface treatment.

14 Claims, 4 Drawing Sheets

(51) Int. Cl.

| | |
|---|---|
| ***G04B 37/22*** | (2006.01) |
| ***B44C 1/26*** | (2006.01) |
| ***C25D 5/34*** | (2006.01) |
| ***C25D 7/00*** | (2006.01) |
| ***C25D 11/16*** | (2006.01) |
| ***C25D 5/02*** | (2006.01) |
| ***C25D 11/02*** | (2006.01) |

(52) U.S. Cl.

CPC ............ *C25D 7/005* (2013.01); *C25D 11/022* (2013.01); *C25D 11/16* (2013.01); *G04B 19/18* (2013.01); *G04B 37/226* (2013.01)

(56) References Cited

U.S. PATENT DOCUMENTS

| | | | | |
|---|---|---|---|---|
| 4,090,934 | A * | 5/1978 | Chesseri | G04B 37/22 968/364 |
| 8,999,217 | B2 | 4/2015 | Winkler et al. | |
| 9,694,386 | B2 * | 7/2017 | Winkler | B21J 1/006 |
| 2005/0136284 | A1 * | 6/2005 | Grippo | C04B 41/009 428/688 |
| 2009/0229307 | A1 * | 9/2009 | Kwan | A44C 17/04 63/26 |
| 2011/0103199 | A1 | 5/2011 | Winkler et al. | |
| 2011/0236580 | A1 | 9/2011 | Winkler et al. | |
| 2011/0259753 | A1 * | 10/2011 | Grossenbacher | C25D 5/627 205/162 |
| 2013/0208577 | A1 * | 8/2013 | Netuschill | G04B 45/00 205/95 |
| 2015/0359303 | A1 * | 12/2015 | Lebreton | G04B 5/16 63/26 |

FOREIGN PATENT DOCUMENTS

| | | | |
|---|---|---|---|
| EP | 0 997 545 | A1 | 5/2000 |
| EP | 2 315 673 | A1 | 5/2011 |
| JP | 2000-144489 | A1 | 5/2000 |
| JP | 2001-68828 | A | 3/2001 |
| JP | 2008-89533 | A | 4/2008 |
| JP | 2008-275522 | A1 | 11/2008 |
| JP | 2012-512385 | A1 | 5/2012 |
| WO | WO 2010/006887 | A1 | 1/2010 |

OTHER PUBLICATIONS

Notice of the Reason for Refusal dated Mar. 8, 2022 in Japanese Patent Application No. 2020-555321 (with English language translation), 5 pages.

Japanese Office Action dated Aug. 31, 2021 in Japanese Patent Application No. 2020-555321 (with English translation), 6 pages.

Notice of Grounds for Rejection dated Jan. 21, 2022 in Korean Patent Application No. 10-2020-7031544 (with English language translation), 10 pages.

Combined Chinese Office Action and Search Report dated Oct. 28, 2022 in Chinese Patent Application No. 20190032841.1 (with English translation), 12 pages.

* cited by examiner

METHOD FOR MANUFACTURING DECORATIVE PARTS

CROSS-REFERENCE TO RELATED APPLICATIONS

The present application is a national stage entry of International Application No. PCT/EP2019/066099, filed Jun. 18, 2019, which claims priority to European Patent Application No. 18180562.3, filed on Jun. 28, 2018, the entire content and disclosure of which are incorporated by reference herein.

FIELD OF THE INVENTION

The present invention relates to a method for manufacturing decorative parts. It relates more particularly to a method for manufacturing a decorative part including a conductive aesthetic element inlaid in a support made of an electrically non-conductive material. The manufacturing method includes, after the inlay step, a step of electrochemically treating the surface of the inlaid elements.

PRIOR ART

It is known to decorate external timepiece components with aesthetic elements. There are, for example, watch bezels decorated with motifs, such as indices. These bezels, which are generally made of ceramic, can be marked in various ways and with different materials, such as gold, silver or platinum. Said marking can be either raised or recessed. In the case of recessed marking, this is achieved by filling pre-machined recesses in the support. The principle used for producing such marking consists in first depositing a conductive adhesion layer by physical vapour deposition (PVD). Once the adhesion layer has been deposited, the recesses are filled with metal by electroforming. This method has the drawback of being complex and extremely slow.

Another method described in EP Patent No. 2315673 consists in inlaying by pressing the aesthetic elements into recesses provided in the support. This document more particularly discloses a method of inlaying by hot pressing an aesthetic element made of an amorphous metal material into a ceramic support to form, for example, indices on a watch bezel. This method has the advantage of being simple to perform, very reproducible and compatible with most supports. Inlaying different materials makes it possible to combine several colours and finishes. However, the production cost of such parts is extremely high, and the finish is often determined by the material used, with a matt finish for materials such as rubber and a satin finish for metals. Moreover, the colour palette that can be achieved is often limited or requires very long development.

SUMMARY OF THE INVENTION

It is an object of the present invention to propose a novel method for manufacturing a decorative part that expands the achievable range of colours and finishes while reducing production costs.

To this end the invention proposes a manufacturing method that combines the advantages of the method of inlaying by pressing an element into a support with the advantages of electrochemical surface treatment and allows the achievable colours and finishes to be changed as required and a protective layer to be formed over the inlaid element.

The present invention more particularly concerns the inlaying of conductive elements in supports made of a non-electrically conductive material, such as ceramic. Hence, the inventiveness of the invention lies in the making of non-visible but accessible contact points on the support in order to bring the current to each inlaid element.

To achieve this, the support includes at least one recess intended to be inlaid with an aesthetic element, said at least one recess being open in one or more places on a side of the part that is not intended to be visible, to respectively form one or more contact points for carrying the current across the aesthetic element during the surface treatment. By means of these non-visible contact points, it is possible to carry the current across numerous fine decorations, such as across a tachymetric scale on a watch bezel. Depending on the treatment, a wide range of colours and even of colour shades can be obtained on these decorations. These contact points make it possible to perform the same electrochemical treatment for each decoration or even to combine different treatments by only carrying the current across one or more of the decorations for each electrochemical treatment. It is also possible to envisage inlaying an element made of less expensive material and then hardening it by an anodizing process in the case of aluminium. It is also possible to envisage inlaying an element made of less expensive metallic material and then depositing precious metals. The amount of precious metal used is thus minimal and there is no wasted material.

This electrochemical treatment is performed on the inlaid decorations in their final surface condition—polished, satin finished, sand blasted—and therefore at the end of the manufacturing process.

Other features and advantages of the present invention will appear in the following description of preferred embodiments, given by way of non-limiting example, with reference to the annexed drawings.

DETAILED DESCRIPTION

Figure 1:
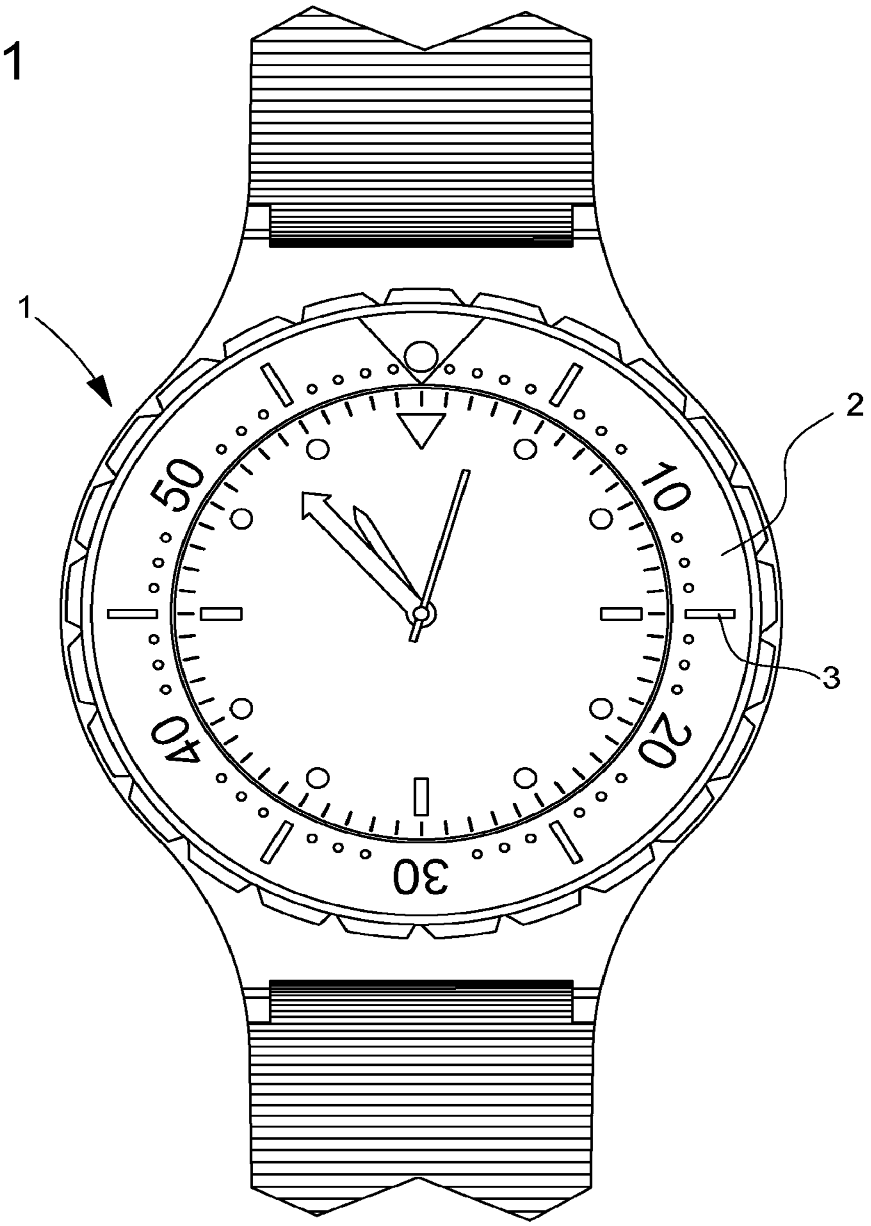
FIG. 1 represents a plan view of a decorative part, and more precisely a watch bezel including indices that are inlaid and electrochemically treated by the manufacturing method of the invention.

The present invention relates to a method for manufacturing a decorative part including a step of inlaying by hot pressing one or more aesthetic elements in a support provided with one or more recesses and including a step of electrochemically treating the surface of said aesthetic elements It also concerns the decorative part produced by the method. The part can, in particular, be an external timepiece component, such as a bezel, a dial, a case, a crown, a push-button, a crystal, a bracelet element, etc. By way of example illustrated in FIGS. 1 and 2, part 1 is a watch bezel including an annular body forming the support 2 provided with recesses 4 arranged in said support 2 for receiving the aesthetic elements 3 forming the indices. By way of another example illustrated in FIGS. 7A to 7C, part 1 is a watch case middle 5 provided with two recesses 4 each inlaid with one aesthetic element 3 set with stones 6.

According to the invention, the support is made of an electrically non-conductive material, such as a ceramic, an enamel, a sapphire, etc. The aesthetic element is made of an electrically conductive material such as a crystalline or amorphous metal alloy. For example, it may be an alloy of aluminium, of titanium or of precious metals such as gold alloys or platinum alloys. Thus, still by way of example, the part can consist of a zirconia watch bezel with indices made of a crystalline aluminium alloy.

Figure 2:
FIG. 2 represents a partial sectional view of this same decorative part.

Support 2 includes at least one recess 4 made by laser etching, machining etc. On the surface 2*a* of support 2 that is intended to be visible, recess 4 has a shape 4*a* corresponding to the contour of the desired decoration (FIG. 2). According to the invention, at least one of the recesses opens onto a non-visible side 2*b* of support 2. Advantageously, the whole space of recess 4 is filled with aesthetic element 3 which projects from or is flush with surface 2*a* of support 2. In a variant, it is also possible for the aesthetic element to only partially fill the space of the recess.

Figure 3:
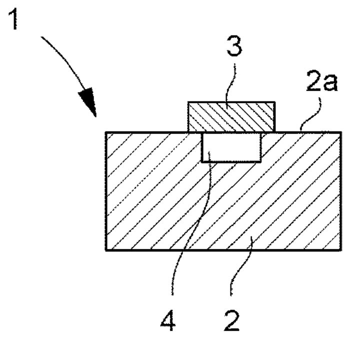
FIGS. 3 to 5 schematically represent the steps of inlaying the preform in the support.
Figure 4:
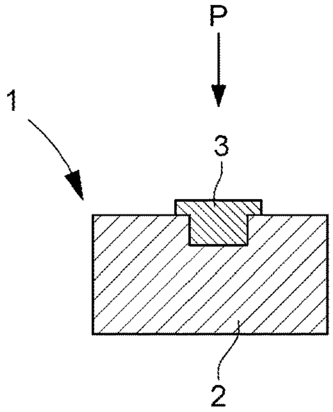
Figure 5:
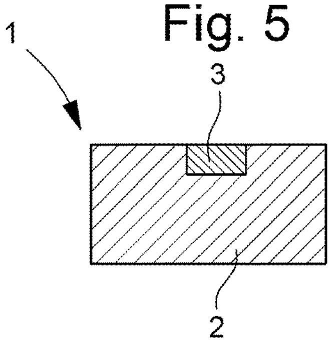

According to the invention, the aesthetic elements are inlaid by a hot pressing process in the recesses of the support. The pressing temperature is variable according to the inlaid material. For example, for a crystalline metal alloy, inlaying is performed at a temperature comprised between the solidus temperature and the liquidus temperature of the alloy forming the aesthetic element. For an amorphous metal alloy, inlaying is performed at a temperature comprised between the glass transition temperature Tg and the crystallisation temperature Tx of the alloy. Likewise, the pressure is adapted according to the material. For example, the load may be comprised between 300 and 1000 kg. The inlay process is performed in a similar manner to that described in EP Patent No. 2315673. More precisely, the inlay steps of the manufacturing method of the invention are schematically illustrated with reference to FIGS. 3 to 5. Firstly, support 2 provided with recess(es) 4 and the preform(s) intended to form the aesthetic element(s) 3 are provided (FIG.3). In the case of a watch bezel to be decorated with indices, the aesthetic element to be inlaid takes the form of an annular preform with a ring diameter and width of substantially equivalent dimensions to those of the indices. Preform 3 is placed on surface 2*a* of support 2 in recess 4. The assembly is placed in a press and the inlay process is performed under a pressure P within the aforementioned temperature ranges in which the material is softened (FIG. 4). The step of inlaying the alloy in the recesses is then followed by a cooling step and possibly a mechanical grinding step performed on upper surface 2*a* and aesthetic element 3, such as polishing, to remove any surplus from aesthetic element 3 (FIG. 5) and to create exposed surfaces of the support and of the aesthetic element that are connected to each other without discontinuity.

By way of example, in the case of an aluminium 7075 alloy inlay in a zirconia support, the preform was heated at 550° C. for 90 seconds and pressed under a load on the order of 750 kg.

After the inlay step and any mechanical grinding step, the aesthetic element is subjected to a finishing treatment. This finishing treatment consists of a selective electrochemical treatment of the inlaid metallic material intended to change the appearance and/or hardness of said material. It may be an anodizing process with or without dyeing, deposition of a precious metal, such as silver, gold, rhodium, platinum, etc. It is thus possible to envisage inlaying a less expensive aluminium alloy and then hardening it with an anodizing process or inlaying a less expensive conductive material and then electroplating a precious metal. As the present invention is intended for electrically non-conductive supports, the difficulty lies in carrying the current to the aesthetic elements during the electrochemical treatment via contact points which absolutely must be non-visible on the decorative part. To this end, one or more of the recesses are configured to open onto a side of the decorative part that is intended to be non-visible. These recesses opening onto the non-visible side form as many contact points for carrying current across the inlaid aesthetic elements. Returning to the example of the ceramic watch bezel having metallic indices formed by an inlay process, the recess 4 for each of the indices opens onto the back side 2*b* of bezel 1, as illustrated in FIG. 2. Contact points 4*b* carry the current across each of the indices during the electrochemical treatment. These contact points 4*b* on back side 2*b* of support 2 can have a smaller cross-section than that of part 4*a* of the recess opening onto visible side 2*a* of support 2. These contact points make it possible to perform the same electrochemical treatment for each index or to combine different treatments by only carrying the current across one or more of the indices for each electrochemical treatment.

Figure 6A:
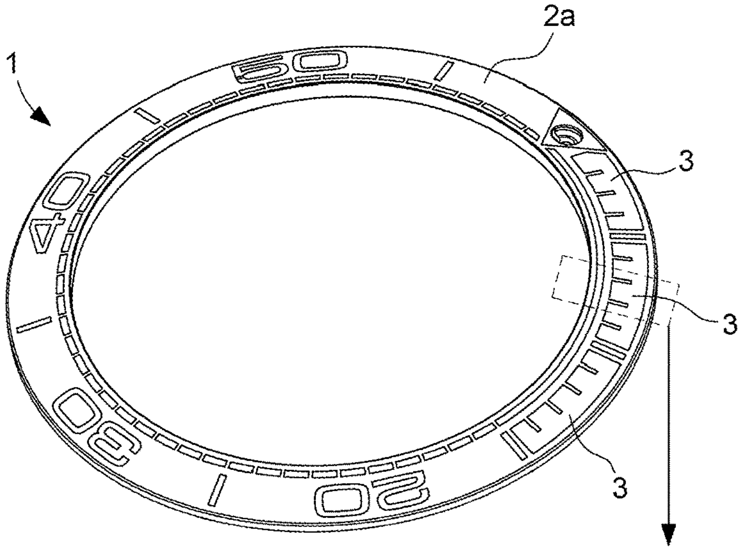
FIG. 6A represents a view of the front side, i.e. the visible side, of the bezel inlaid with several aesthetic elements.
Figure 6C:
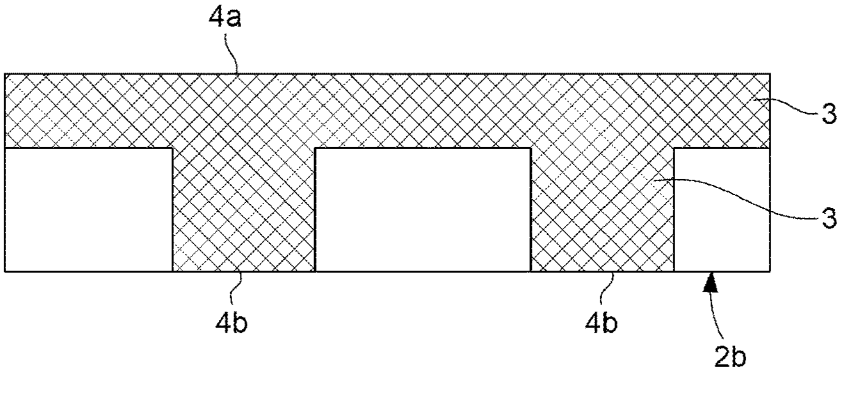
FIG. 6C represents a sectional view focused on one aesthetic element.
Figure 6B:
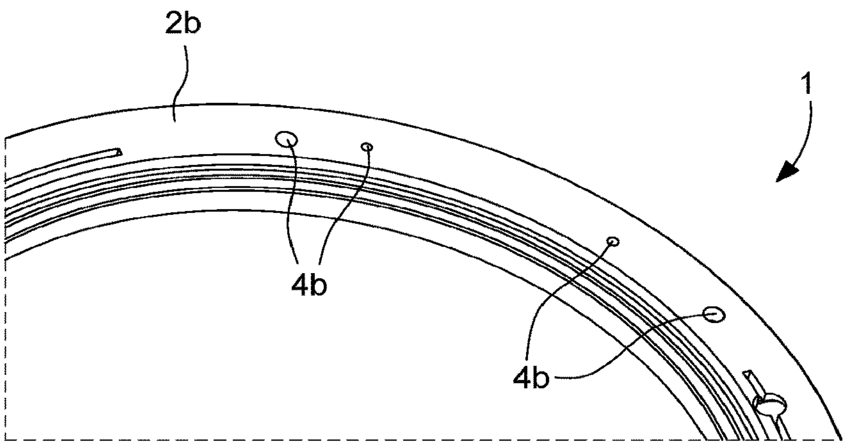
FIG. 6B represents a view of the back side of this same bezel.
Figure 7A:
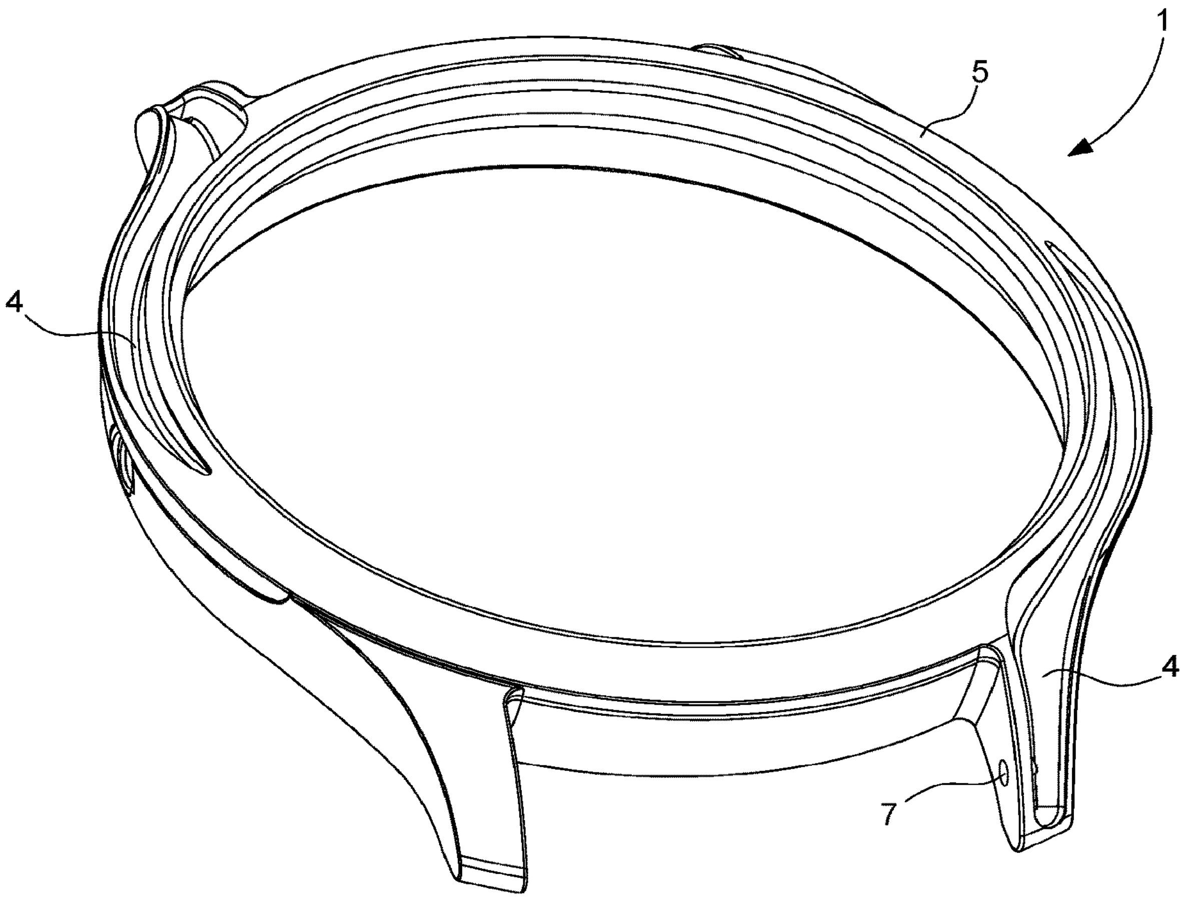
FIG. 7A represents a three-dimensional view of a watch case whose case middle includes a recess communicating with the hole for insertion of the spring bar.
Figure 7B:
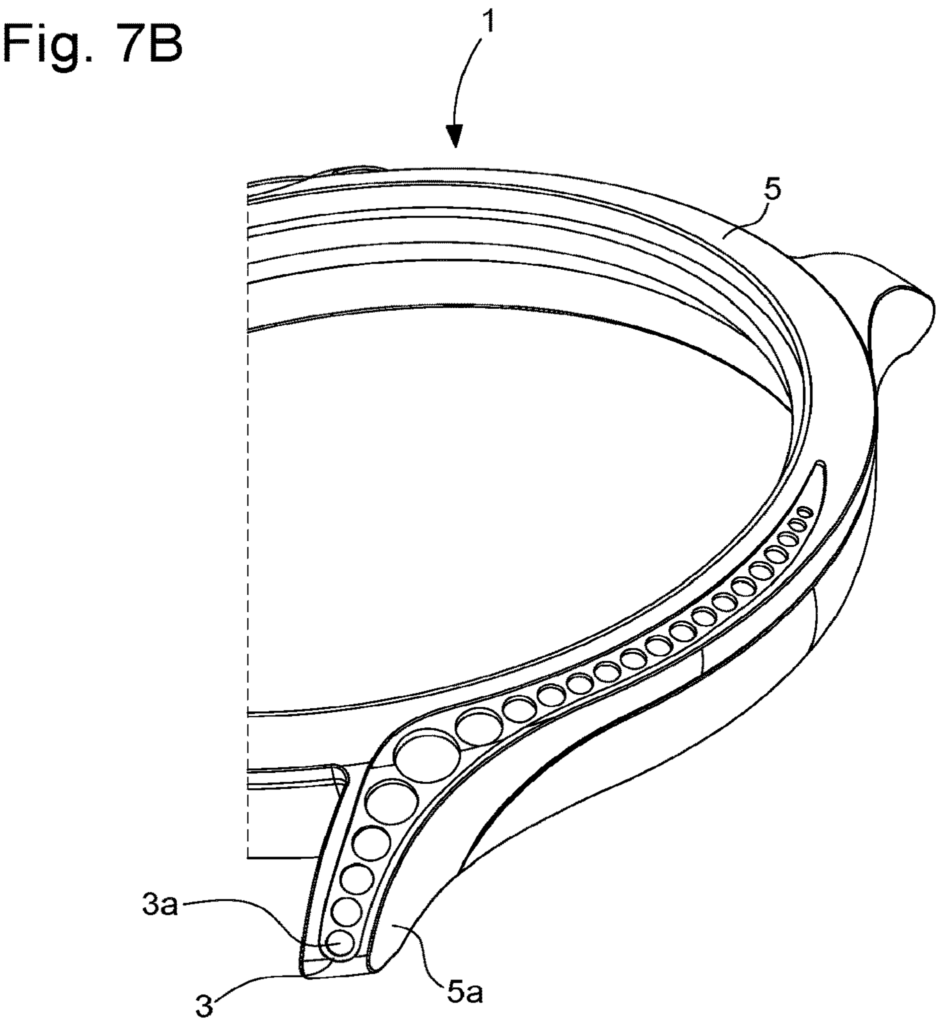
FIG. 7B represents the same watch case including an aesthetic element inlaid in the recess.
Figure 7C:
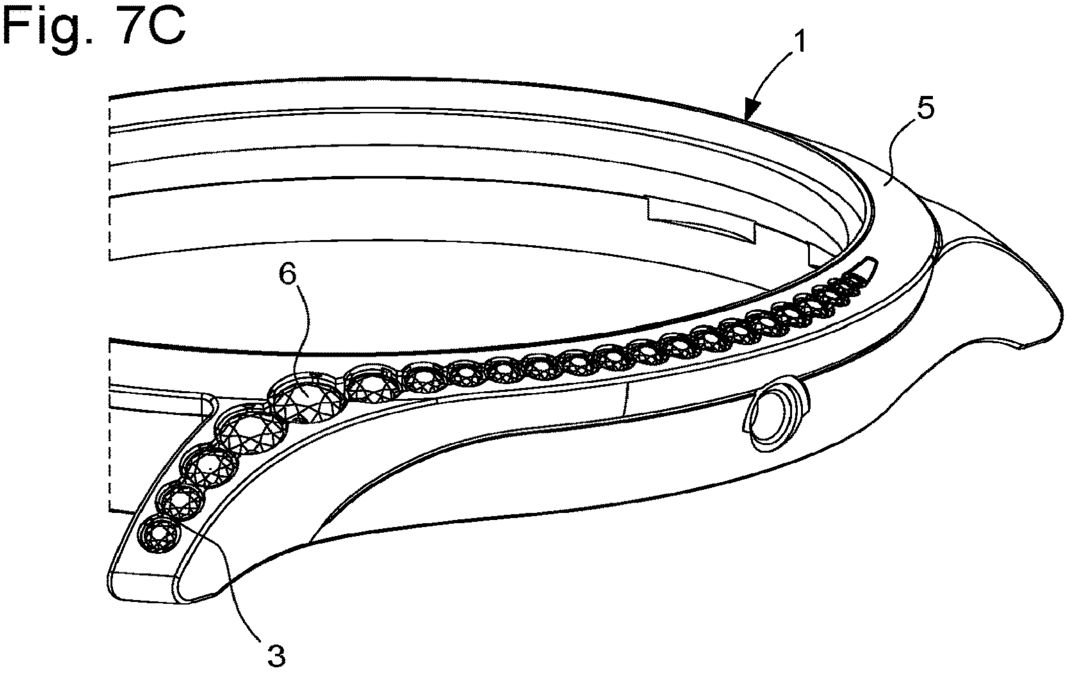
FIG. 7C represents the same watch case including the aesthetic element inlaid in the recess and set with stones.

If aesthetic element 3 is of larger size, as in the examples of FIGS. 6A and 7B, several contact points may be required per aesthetic element in order to ensure a uniform electrochemical treatment of the aesthetic element. In FIG. 6A, for example, three aesthetic elements 3 are arranged on an annular portion of visible side 2*a* of bezel 1. In this configuration, aesthetic elements 3 are inlaid on substrate 2 including the indices made of a non-conductive material. On its back side 2*b* visible in FIG. 6B, bezel 1 is provided with several orifices 4*b* communicating with recesses 4 to form the contact points for carrying current across these three elements. As represented in the sectional view of FIG. 6C, two contact points 4*b* are provided per aesthetic element 3. FIGS. 7B and 7C represent another configuration of an aesthetic element inlaid in a recess arranged in a support. The inlaid aesthetic element 3 extends as far as a horn 5*a* of watch case middle 5 and includes a plurality of housings 3*a* for setting stones 6 in a subsequent operation, which is particularly advantageous for decorating watch cases made of non-ductile material such as ceramic. In a similar manner to the other examples, the recess receiving the aesthetic element opens in at least one place onto a non-visible side of the watch case. It is thus possible for recess 4 to communicate with hole 7 for insertion of the spring bar, as illustrated in FIG. 7A. Of course, recess 4 can communicate in several places via other through orifices to make contact points carrying current to aesthetic element 3. By means of contact point(s) provided on a non-visible side of the watch case, the present invention thus makes it possible to perform an electrochemical treatment on the aesthetic element once the stones have been set.

The present invention was more specifically illustrated for a decorative part used in horology, but it is evident that the method of the invention applies to the making of decorative parts in many other fields, such as jewellery, telephony, the automobile industry, etc.

Key to Drawings (1) Decorative part
(2) Support
a. Visible side
b. Non-visible side
(3) Aesthetic element or preform
a. Housing
(4) Recess
a. Portion opening onto the visible side of the support
b. Portion opening onto the non-visible side of the support
(5) Watch case
a. Horn
(6) Stone
(7) Hole for insertion of the spring bar

The invention claimed is:

1. A part, comprising:

a support made of an electrically non-conductive material, said support being provided with at least one recess filled with an aesthetic element made of an electrically conductive material, said aesthetic element forming a decoration on a visible side of the part, wherein said at least one recess opens in one or more places onto a face of the part that is configured to be non-visible and the aesthetic element includes a surface coating layer, wherein the part is a watch case middle forming the support with said at least one recess inlaid with the aesthetic element forming a portion of the case middle, wherein the portion of the case middle extends up to a horn of the case middle, and wherein a recess of said at least one recess communicates with a hole for insertion of a spring bar arranged in the horn of the case middle.

2. The part according to claim 1, wherein the coating layer is a precious metal.

3. The part according to claim 1, wherein the coating layer is an anodized layer or a metallic layer.

4. The part according to claim 1, wherein the support is made of a material chosen from among ceramic, sapphire and enamel.

5. The part according to claim 1, wherein the aesthetic element is made of an amorphous metal, a crystalline metal or one of their alloys.

6. The part according to claim 1, wherein the aesthetic element is made of an aluminium, titanium or precious metal alloy.

7. A method for manufacturing a part comprising a support made of an electrically non-conductive material, said support being provided with at least one recess filled with an aesthetic element made of an electrically conductive material, said aesthetic element forming a decoration on a side of the part that is configured to be visible, the method comprising:

providing the support having said at least one recess and providing a preform configured to form the aesthetic element of the part;

inlaying by pressing the preform into said at least one recess in the support; and electrochemically treating the surface of the aesthetic element, wherein a recess of said at least one recess opens in two or more places onto a side of the part that is configured to be non-visible, to respectively form one or more contact points for carrying current across the aesthetic element during the surface treatment, wherein the part is a watch case middle forming the support with said at least one recess filled with the aesthetic element forming a portion of the case middle, wherein the portion of the case middle extends up to a horn of the case middle, and wherein a recess of said at least one recess communicates with a hole for insertion of a spring bar arranged in the horn of the case middle.

8. The method according to claim 7, wherein the support is made of a material chosen from among ceramic, sapphire and enamel.

9. The method according to claim 7, wherein the aesthetic element is made of an amorphous metal, a crystalline metal or one of their alloys.

10. The method according to claim 7, wherein the aesthetic element is made of an aluminium, titanium or precious metal alloy.

11. The method according to claim 7, wherein said electrochemically treating the surface is performed after mechanical grinding following the inlaying.

12. The method according to claim 7, wherein said electrochemically treating the surface is performed after setting stones in the aesthetic element inlaid in said at least one recess.

13. The method according to claim 7, wherein said electrochemically treating the surface is performed is an anodizing process or a metal deposition process.

14. The method according to claim 7, wherein said electrochemically treating the surface is performed is an anodizing process or a metal deposition process of a precious metal.

* * * * *